United States Patent
Lai et al.

(10) Patent No.: US 8,369,392 B2
(45) Date of Patent: Feb. 5, 2013

(54) CABLE MODEM

(75) Inventors: Chun-Chieh Lai, Taipei Hsien (TW); Yew-Min Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 184 days.

(21) Appl. No.: 12/720,646

(22) Filed: Mar. 9, 2010

(65) Prior Publication Data

US 2011/0075716 A1   Mar. 31, 2011

(30) Foreign Application Priority Data

Sep. 30, 2009 (CN) .......................... 2009 1 0308012

(51) Int. Cl.
  *H04B 1/38* (2006.01)
  *H04L 5/16* (2006.01)
(52) U.S. Cl. ...................................................... 375/222
(58) Field of Classification Search .................. 375/224, 375/225, 257, 222; 379/3, 394, 1.04, 391, 379/140, 399.01, 22.02; 370/289, 290, 269, 370/252, 247
See application file for complete search history.

(56) References Cited

U.S. PATENT DOCUMENTS

| | | | | |
|---|---|---|---|---|
| 5,287,405 A * | 2/1994 | Sano | | 379/386 |
| 6,662,135 B1 * | 12/2003 | Burns et al. | | 702/120 |
| 7,003,078 B2 * | 2/2006 | Starr et al. | | 379/27.01 |
| 7,023,985 B1 * | 4/2006 | Hauptmann et al. | | 379/394 |

FOREIGN PATENT DOCUMENTS

CN  101114844 A  1/2008

OTHER PUBLICATIONS

Dermirli et al., Model Based Time-Frequency Estimation of Ultrasonic Echoes for NDE Applications, Oct. 2000, Ultrasonics Symposium IEEE.*

* cited by examiner

*Primary Examiner* — David C. Payne
*Assistant Examiner* — Wednel Cadeau
(74) *Attorney, Agent, or Firm* — Altis Law Group, Inc.

(57) ABSTRACT

A cable modem includes a subscriber line interface circuit (SLIC) that is connected to a telephone. The cable modem can send a signal to the telephone through the SLIC, and detect signal reflection of the telephone in the SLIC. The cable modem measures frequencies of the signal reflection and the output of the telephone. The cable modem also compares the measured frequencies with corresponding thresholds and self-determines to be qualified or unqualified, based upon the comparisons.

4 Claims, 2 Drawing Sheets

CABLE MODEM

BACKGROUND

1. Technical Field

The present disclosure relates to telephone communication, and particularly, to a cable modem capable of self-determining to be qualified or unqualified.

2. Description of Related Art

Generally, telephones are connected to a communications network through a cable modem. The cable modem converts network digital signals from the communications network into radio frequency analog signals usable by the telephone and converts radio frequency analog signals from the telephone into network digital signals usable by the communications network. The cable modem includes a subscriber line interface circuit (SLIC) coupled to the telephone. To improve communication quality, an impedance of the SLIC is set substantially equal to (i.e., match) a fixed impedance of the telephone to minimize signal reflection (i.e., noise). However, the impedance of the SLIC may not match that of the telephone. Therefore, it is necessary to detect the presence of noise from a cable modem before practical usage thereof. Such detection is typically carried out by an external detection device, increasing cost and complexity.

Therefore, it is desirable to provide a cable modem which can overcome the limitations described.

DETAILED DESCRIPTION

Figure 1:
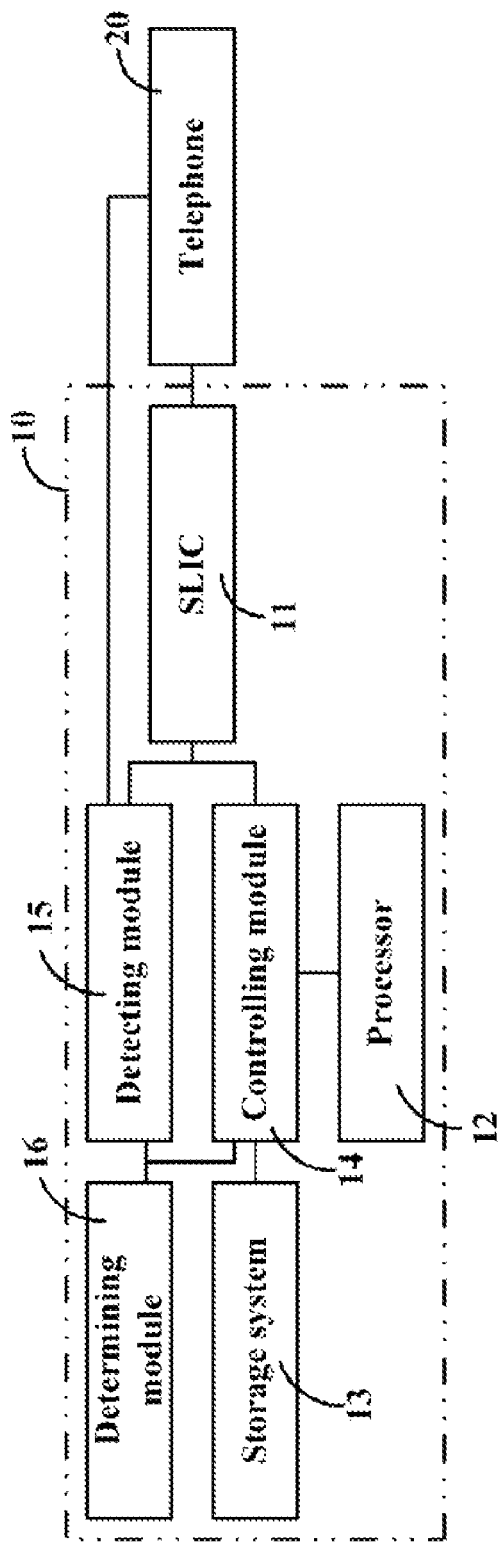
FIG. 1 is a functional diagram of an exemplary embodiment of a cable modem.

Referring to FIG. 1, a cable modem 10, according to an exemplary embodiment, includes a subscriber line interface circuit (SLIC) 11, a processor 12, a storage system 13, a controlling module 14, a detecting module 15, and a determining module 16. The SLIC 11 is connected to a telephone 20. The controlling module 14 is configured to send a test signal to the telephone 20 via the SLIC 11. The detecting module 15 is configured to measure a frequency of signal reflection of the telephone 20 in the SLIC 11 and a frequency of the output of the telephone 20. The determining module 16 is configured to determine whether the cable modem 10 is qualified or unqualified based upon comparisons of the measured frequencies with predetermined thresholds.

All of the modules described above, such as the controlling module 14, the detecting module 15, and the determining module 16, may be embodied in, and fully automated via, software code modules executed by one or more general purpose computers or processors, for example, the processor 12. The code modules may be stored in any type of computer-readable medium or other storage device, for example, the storage system 13. Some or all of the modules may alternatively be embodied in specialized computer hardware or communication apparatus.

Figure 2:
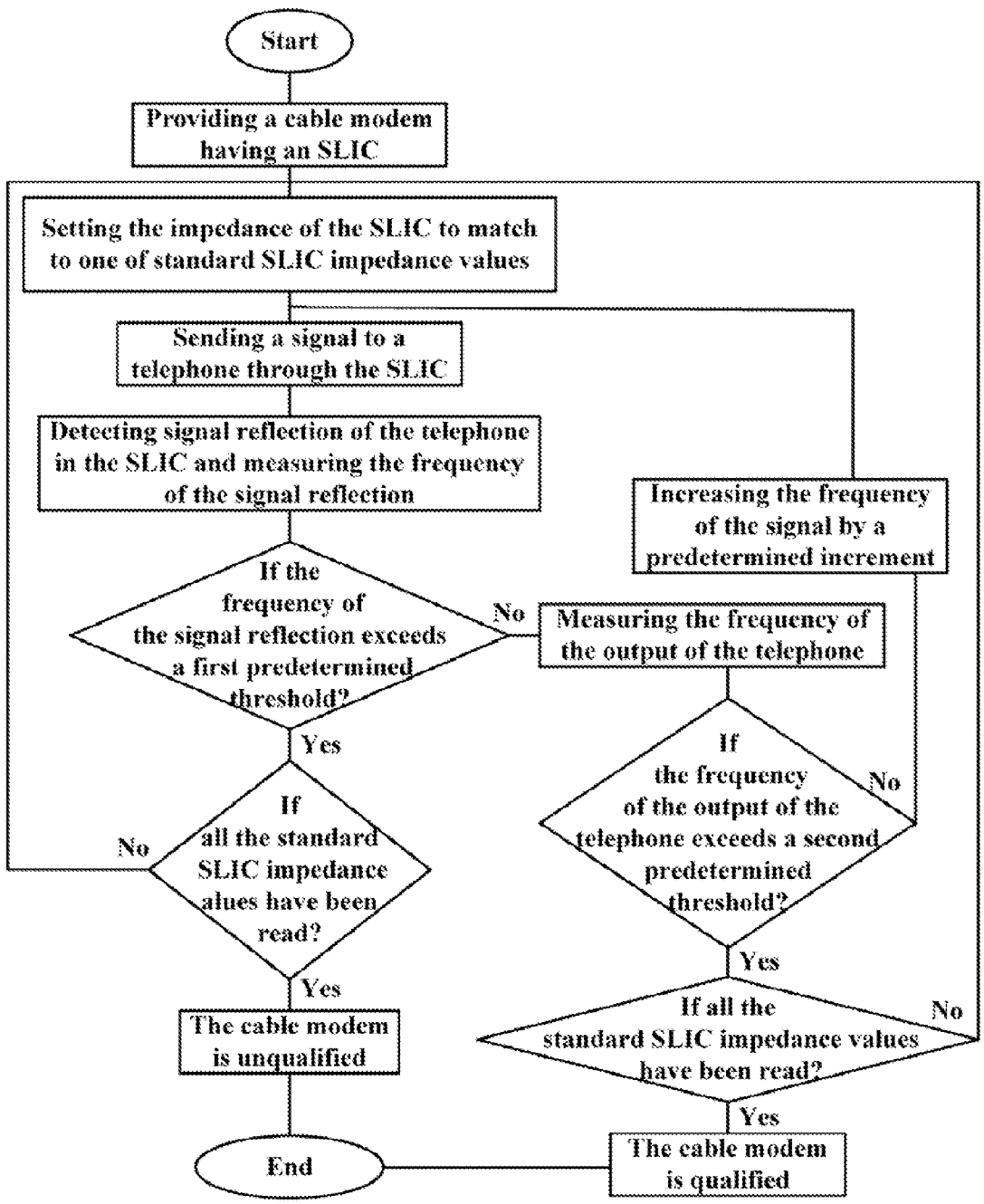
FIG. 2 is a flowchart of a testing method of the cable modem of FIG. 1.

The storage system 13 stores a number of standard SLIC impedance values. Generally, telephones of different countries have different standard SLIC impedance values. In this embodiment, the standard SLIC impedance values of various countries in the world may be stored in the storage system 13. As such, the cable modem 10 can be properly used in many countries in the world. However, all the standard SLIC impedance values require to be tested, where the impedance of the SLIC 11 is set to each of the standard SLIC impedance values in sequence and corresponding testing steps (see below and FIG. 2) are carried out. Depending on the embodiment, the storage system 13 may be a hard disk drive, random access memory, and/or a read only memory, for example.

The controlling module 14 is connected to the storage system 13 and the SLIC 11. Also referring to FIG. 2, in a testing operation, the controlling module 14 reads a standard SLIC impedance value from the storage system 13 and adjusts the impedance of the SLIC 11 to match the acquired standard SLIC impedance value. The controlling module 14 also sends a test signal to the telephone 20 through the SLIC 11 after the impedance value of the SLIC 11 is adjusted.

The detecting module 15 is connected to the SLIC 11 and the telephone 20. The detecting module 15 detects signal reflection of the telephone 20 in the SLIC 11 and measures the frequency of the detected signal reflection.

The determining module 16 is connected to the detecting module 15 and the controlling module 14. The determining module 16 determines whether the frequency of the signal reflection exceeds a first predetermined threshold, such as, for example, 20 Hz. If the frequency of the signal reflection exceeds the first predetermined threshold, the determining module 16 determines whether all the standard SLIC impedance values have been read or not been read. If the frequency of the signal reflection does not exceed the first predetermined threshold, the determining module 16 signals the detecting module 15 to measure the frequency of the output of the telephone 20.

If all the standard SLIC impedance values have been read and the frequencies of signal reflection corresponding to all the standard SLIC impedance values exceed the first predetermined threshold, the cable modem 10 is determined to be unqualified and the testing operation of the cable modem 10 ends. If the frequency of the signal reflection exceeds the first predetermined threshold but not all the standard SLIC impedance values have been read, the determining module 16 signals the controlling module 14 to read a subsequent unread standard SLIC impedance value and set the impedance of the SLIC 11 to match the newly read standard SLIC impedance value.

The determining module 16 determines whether the frequency of the output of the telephone 20 exceeds a second predetermined threshold, such as, for example, 3.5 kHz. If the frequency of the output of the telephone 20 exceeds the second predetermined threshold, the determining module 16 determines whether all the standard SLIC impedance values have been read or not been read. If the frequency of the output of the telephone 20 does not exceed the second predetermined threshold, the determining module 16 signals the controlling module 14 to increase the frequency of the test signal by a predetermined increment such as 0.5 kHz.

If all the standard SLIC impedance values have been read, and corresponding to any one of the standard SLIC impedance value the frequency of the signal reflection is below the first predetermined threshold and the frequency of the output of the telephone 20 exceeds the second predetermined threshold, the cable modem 10 is determined to be qualified and the testing operation ends. If not all the standard SLIC impedance values have been read, the determining module 16 signals the controlling module 14 to read a subsequent unread standard SLIC impedance value and adjust the impedance of the SLIC 11 to match the same.

It should be understood that, if the cable modem 10 is intended for use in only one country, the impedance of the SLIC 11 can be set to match the standard SLIC impedance value directly and the storage system 13 can be omitted.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A cable modem for a telephone, the cable modem comprising:
   a subscriber line interface circuit connected to the telephone; and
   a controlling module configured to send a test signal to the telephone via the subscriber line interface circuit;
   a detecting module configured to measure a frequency of signal reflection of the telephone in the subscriber line interface circuit and a frequency of an output of the telephone, and
   a determining module configured to compare the frequency of signal reflection and the frequency of the output of the telephone with corresponding predetermined thresholds and determine whether the cable modem is qualified or unqualified, based upon the comparisons.

2. The cable modem of claim 1, further comprising a storage system that stores a plurality of standard subscriber line interface circuit impedance values of telephones of different countries, the controlling module being configured to read the standard subscriber line interface circuit impedance value in sequence, and set the impedance of the subscriber line interface circuit to match each standard subscriber line interface circuit impedance value.

3. A testing method of a cable modem, the cable modem comprising an subscriber line interface circuit connected to a telephone, the operating method comprising:
   sending a test signal to the telephone through the subscriber line interface circuit;
   detecting signal reflection of the subscriber line interface circuit by the telephone;
   measuring a frequency of the signal reflection;
   determining whether the frequency of the signal reflection exceeds a first predetermine threshold, wherein the cable modem is determined to be unqualified if the frequency of the signal reflection exceeds the first predetermined threshold;
   measuring the frequency of the output of the telephone if the frequency of the signal reflection does not exceed a first predetermined threshold;
   determining whether the frequency of the output of the telephone exceeds a second predetermined threshold, wherein the cable modem is determined to be qualified if the frequency of the output of the telephone exceeds the second predetermined threshold; and
   increasing the frequency of the test signal if the frequency of the output of the telephone does not exceed the second predetermined threshold and returning back to the sending step.

4. The operating method of claim 3, further comprising:
   storing a plurality of standard subscriber line interface circuit impedance values of telephone of different countries; and
   reading the standard subscriber line interface circuit impedance value in sequence; and
   setting the impedance of the subscriber line interface circuit to match each acquired standard subscriber line interface circuit impedance value.

* * * * *